United States Patent
Mao

(10) Patent No.: US 10,619,826 B2
(45) Date of Patent: Apr. 14, 2020

(54) CONFIGURABLE LIGHTING DEVICE USING A LIGHT SOURCE, OPTICAL MODULATOR, AND ONE OR MORE LENSES

(71) Applicant: ABL IP HOLDING LLC, Conyers, GA (US)

(72) Inventor: An Mao, Reston, VA (US)

(73) Assignee: ABL IP HOLDING LLC, Conyers, GA (US)

( * ) Notice: Subject to any disclaimer, the term of this patent is extended or adjusted under 35 U.S.C. 154(b) by 329 days.

(21) Appl. No.: 15/228,371

(22) Filed: Aug. 4, 2016

(65) Prior Publication Data
US 2018/0038576 A1 Feb. 8, 2018

(51) Int. Cl.
| | |
|---|---|
| *F21V 14/00* | (2018.01) |
| *G02B 26/00* | (2006.01) |
| *G02B 26/08* | (2006.01) |
| *F21V 5/00* | (2018.01) |
| *F21V 5/04* | (2006.01) |
| *F21Y 113/10* | (2016.01) |
| *F21Y 115/10* | (2016.01) |

(52) U.S. Cl.
CPC ............ *F21V 14/003* (2013.01); *F21V 5/007* (2013.01); *F21V 5/008* (2013.01); *F21V 5/04* (2013.01); *G02B 26/005* (2013.01); *G02B 26/0875* (2013.01); *F21Y 2113/10* (2016.08); *F21Y 2115/10* (2016.08)

(58) Field of Classification Search
CPC .......................... G02B 26/005; G02B 13/0075
USPC ......................................................... 362/277
See application file for complete search history.

(56) References Cited

U.S. PATENT DOCUMENTS

| | | | |
|---|---|---|---|
| 8,773,766 B2 * | 7/2014 | Jannard | ........... G02B 3/14 359/666 |
| 2007/0097515 A1 | 5/2007 | Jung et al. | |
| 2010/0230611 A1 | 9/2010 | Fukuyama | |
| 2010/0296148 A1 * | 11/2010 | Reichelt | ........... G02B 26/005 359/228 |
| 2011/0085244 A1 | 4/2011 | Jannard et al. | |
| 2015/0153020 A1 | 6/2015 | Akiyama | |

(Continued)

OTHER PUBLICATIONS

Non Final Office Action for U.S. Appl. No. 15/228,414, dated Aug. 30, 2018, 11 pages.

(Continued)

*Primary Examiner* — William J Carter
(74) *Attorney, Agent, or Firm* — RatnerPrestia

(57) ABSTRACT

A configurable lighting device may include a light source, a first lens, one or more second lenses, and a controllable optical modulator. The first lens is coupled to receive and redirect light output from the source. The second lenses are positioned to receive the light redirected by the first lens. The controllable optical modulator is between the first and second lenses. The controllable optical modulator is coupled to receive and spatially modulate light redirected by the first lens. The one or more second lenses are coupled to receive and redirect light modulated by the controllable optical modulator. The optical modulator is selectively controllable to steer and/or shape the light redirected by the first lens to a selected distribution of the light on the one or more second lenses.

4 Claims, 14 Drawing Sheets

(56) References Cited

U.S. PATENT DOCUMENTS

2016/0054483 A1    2/2016  Feng et al.

OTHER PUBLICATIONS

Non Final Office Action for U.S. Appl. No. 15/228,414, dated Feb. 15, 2019—11 pages.
Notice of Allowance for U.S. Appl. No. 15/228,414, dated Jul. 1, 2019, 14 pages.

* cited by examiner

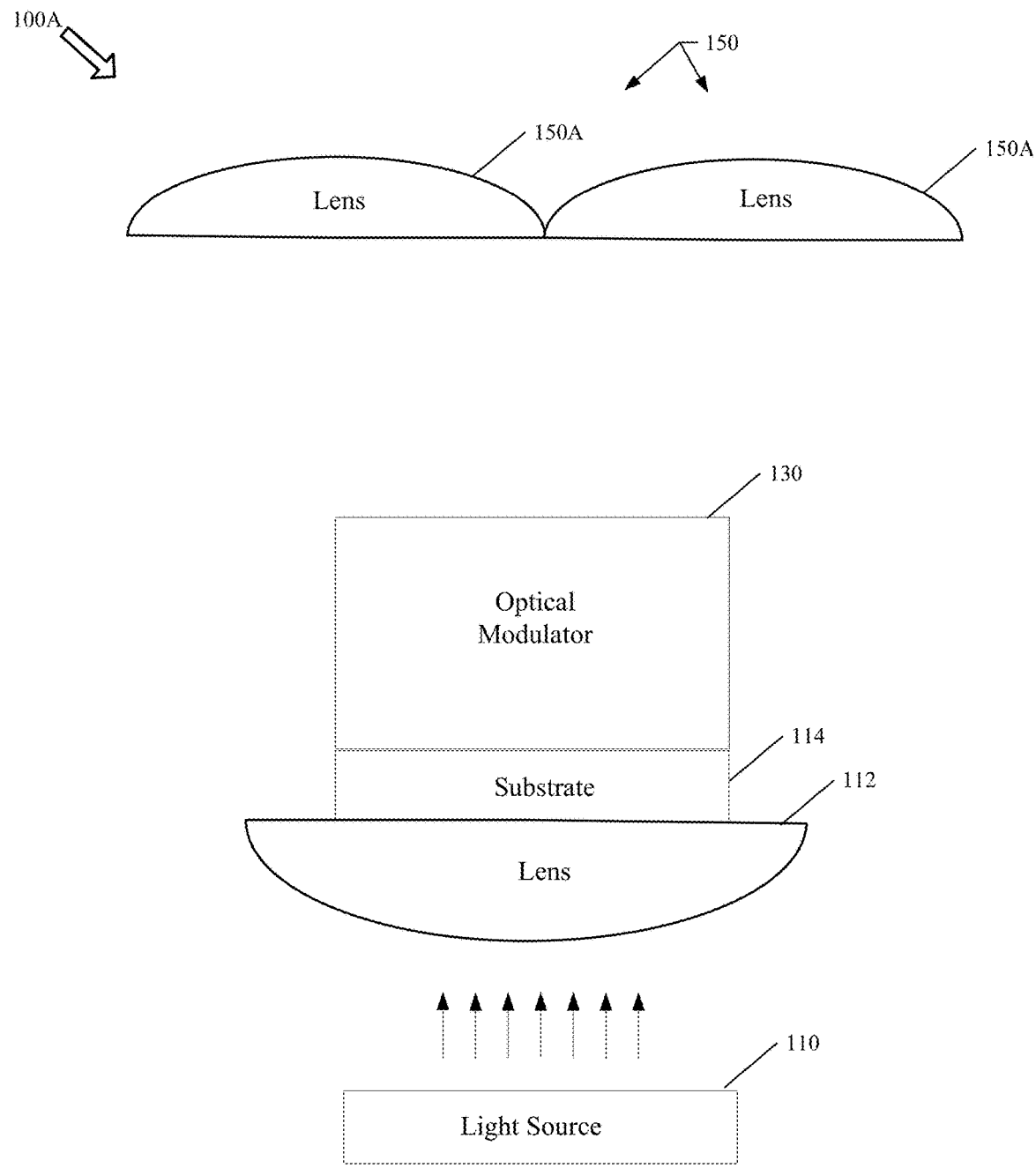

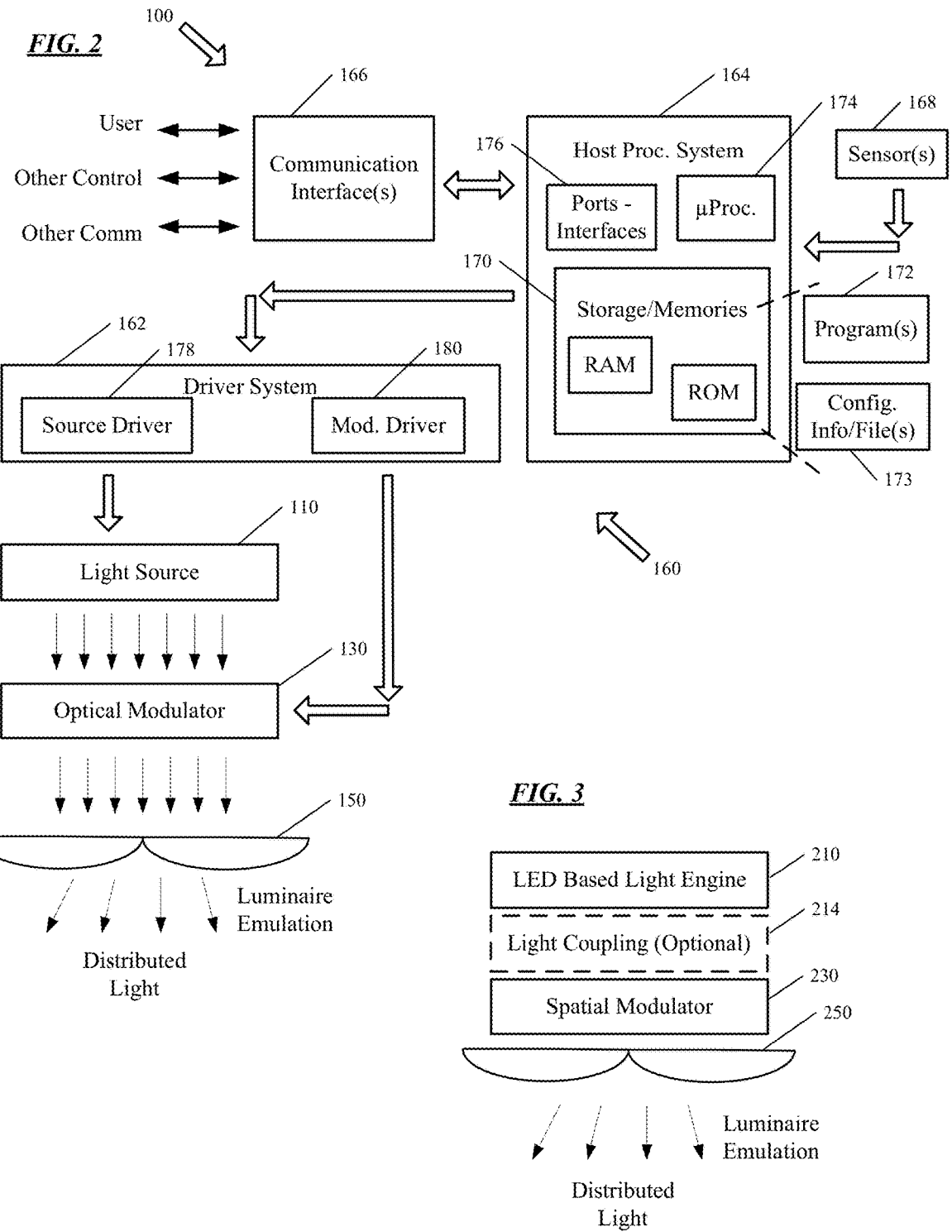

CONFIGURABLE LIGHTING DEVICE USING A LIGHT SOURCE, OPTICAL MODULATOR, AND ONE OR MORE LENSES

TECHNICAL FIELD

The disclosed subject matter relates to lighting devices, and to configurations and/or operations thereof, whereby a lighting device having a light source, an optical modulator, and one or more lenses is configurable by software for a programmable controller, e.g. to emulate a lighting distribution of a selected one of a variety of different lighting devices.

BACKGROUND

Electrically powered artificial lighting has become ubiquitous in modern society. Electrical lighting devices are commonly deployed, for example, in homes, buildings of commercial and other enterprise establishments, as well as in various outdoor settings.

In conventional lighting devices, the luminance output can be turned ON/OFF and often can be adjusted up or dimmed down. In some devices, e.g. using multiple colors of light emitting diode (LED) type sources, the user may be able to adjust a combined color output of the resulting illumination. The changes in intensity or color characteristics of the illumination may be responsive to manual user inputs or responsive to various sensed conditions in or about the illuminated space. The optical distribution of the light output, however, typically is fixed. Various different types of optical elements are used in such lighting devices to provide different light output distributions, but each type of device has a specific type of optic designed to create a particular light distribution for the intended application of the lighting device. The dimming and/or color control features do not affect the distribution pattern of the light emitted from the luminaire.

To the extent that multiple distribution patterns are needed for different lighting applications, multiple luminaires must be provided. To meet the demand for different appearances and/or different performance (including different distributions), a single manufacturer of lighting devices may build and sell thousands of different luminaires.

Some special purpose light fixtures, for example, fixtures designed for stage or studio type lighting, have implemented mechanical adjustments. Mechanically adjustable lenses and irises enable selectable adjustment of the output light beam shape, and mechanically adjustable gimbal fixture mounts or the like enable selectable adjustment of the angle of the fixture and thus the direction of the light output. The adjustments provided by these mechanical approaches are implemented at the overall fixture output. Such adjustments provide relatively coarse overall control and are really optimized for special purpose applications, not general lighting.

There have been more recent proposals to develop lighting devices offering electronically adjustable light beam distributions, using a number of separately selectable/controllable solid state lamps or light engines within one light fixture. In at least some cases, each internal light engine or lamp may have an associated adjustable electro-optic component to adjust the respective light beam output, thereby providing distribution control for the overall illumination output of the fixture.

Although the more recent proposals provide a greater degree of distribution adjustment and may be more suitable for general lighting applications, there may be room for still further improvement in the degree of adjustment supported by the lighting device.

SUMMARY

The concepts disclosed herein improve over the art by providing software configurable lighting equipment with one or more lenses cascaded with an optical modulator, such as an electrowetting optic.

The detailed description below and the accompanying drawings disclose examples of a configurable lighting device. In such an example, the lighting device may include a light source, a first lens, one or more second lenses, and a controllable optical modulator. The first lens is coupled to receive and redirect light output from the source. The second lenses are positioned to receive the light redirected by the first lens. The controllable optical modulator is between the first and second lenses. The controllable optical modulator is coupled to receive and spatially modulate light redirected by the first lens. The one or more second lenses are coupled to receive and redirect light modulated by the controllable optical modulator. The optical modulator is selectively controllable to steer and/or shape the light redirected by the first lens to a selected distribution of the light on the one or more second lenses.

The one or more second lenses may be configured as a multi-lens arrangement. The multi-lens arrangement may include two or more lenses in contact with each other. The contact between the two lenses may intersect or fall on an optical axis of the controllable optical modulator. In some examples, the multi-lens arrangement may be a 2×2 array of lenses. The one or more second lenses may alternatively be configured as a single spherical or aspherical fisheye lens.

The elements of the lighting device may be combined together in one relatively integral unit, e.g. in a luminaire. Alternatively, the elements of the device may be somewhat separate from each other, e.g. with the controller and possibly the memory separate from the light source and the controllable optical modulator.

In a number of examples, an artificial lighting luminaire includes a light source configured to provide artificially generated light for a general lighting application and a controllable electrowetting optic coupled to selectively, optically process the light output from the light source.

The examples discussed below also encompass methods of operation or control of configurable luminaires or other lighting devices, methods of installation of configuration information in such equipment, as well as programming and/or configuration information files for such equipment, e.g. as may be embodied in a machine readable medium. In these examples, a controller may be provided for controlling the optical modulator and/or the light source.

Additional objects, advantages and novel features of the examples will be set forth in part in the description which follows, and in part will become apparent to those skilled in the art upon examination of the following and the accompanying drawings or may be learned by production or operation of the examples. The objects and advantages of the present subject matter may be realized and attained by means of the methodologies, instrumentalities and combinations particularly pointed out in the appended claims.

BRIEF DESCRIPTION OF THE DRAWINGS

The drawing figures depict one or more implementations in accord with the present concepts, by way of example only, FIGS. 1A and 1B are high-level block diagrams of examples of configurable lighting devices, systems or apparatuses.

FIG. 2 is a high-level functional block diagram of a configurable lighting device, system or apparatus.

FIG. 3 is a high-level functional block diagram of an example of the light source and spatial modulator of a configurable lighting device.

DETAILED DESCRIPTION

Figure 1B:
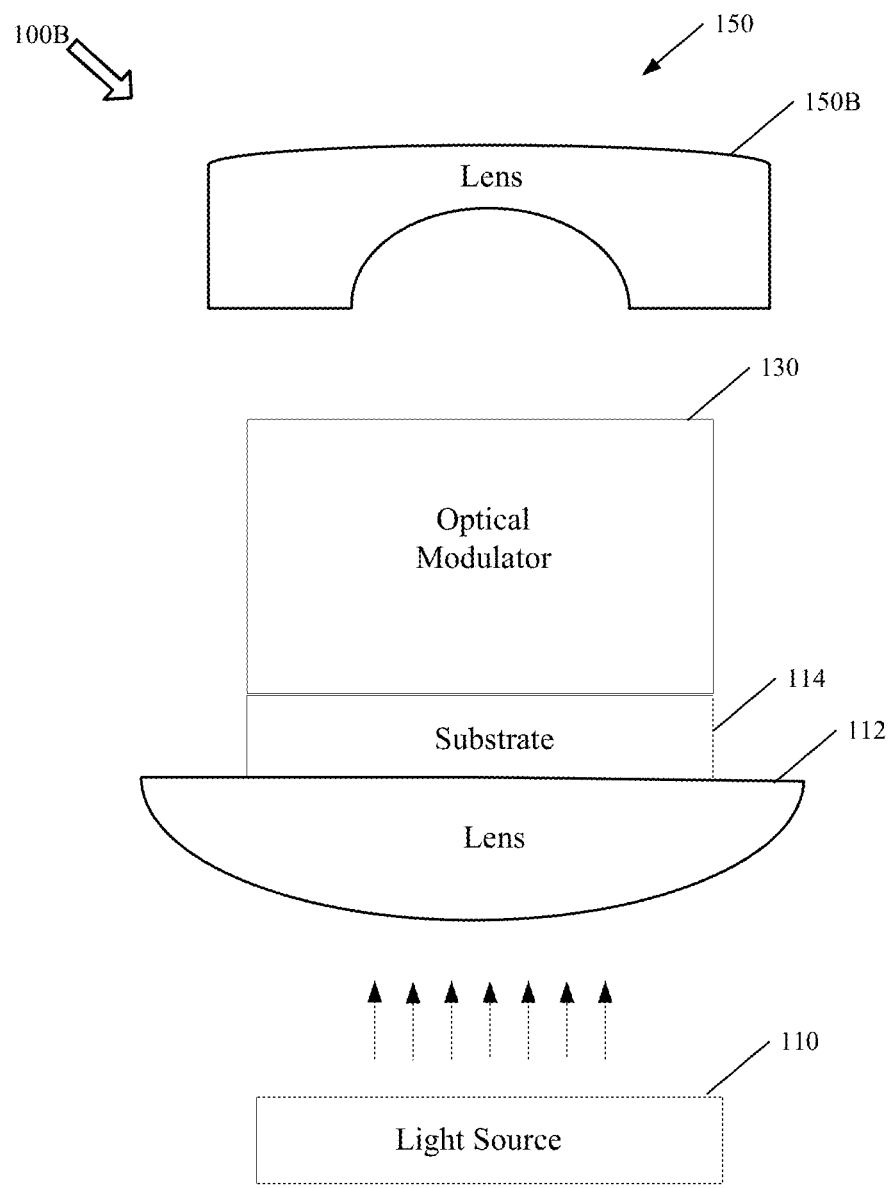

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

The examples discussed below and shown in the drawings improve over the art by providing configurable lighting devices. Human habitation often requires augmentation of natural ambient lighting with artificial lighting. For example, many office spaces, commercial spaces and/or manufacturing spaces require task lighting even when substantial amounts of natural ambient lighting are available. The configurable lighting techniques under consideration here may be applied to any indoor or outdoor region or space that requires at least some artificial lighting. The lighting equipment involved here provides the main artificial illumination component in the space, rather than ancillary light output as might be provided by a display, or by or in association with a sound system, or the like. As such, the illumination from the fixtures, lamps, luminaires or other types of lighting devices is the main artificial illumination that supports the purpose of the space, for example, the lighting that alone or in combination with natural lighting provides light sufficient to allow occupants in the space to perform the normally expected task or tasks associated with the planned usage of the space. Often, such lighting is referred to as "general" lighting or "general" illumination.

The various examples disclosed herein relate to a lighting device that is configurable to enhance steering of light from a light source by changing the distribution of light on one or more lenses cascaded with a controllable optical modulator. This enhanced steering may be used to emulate a lighting distribution of a selected one of a variety of different lighting devices. In the examples, such a device includes a light source, a controllable optical modulator, and one or more lenses. The modulator spatially modulates light output from the light source onto the one or more lenses to create a selected distribution of light, e.g., to emulate a lighting distribution of a selected one of a number of types of luminaire for a general illumination application.

The term "lighting device" as used herein is intended to encompass essentially any type of device that processes power to generate light, for example, for illumination of a space intended for use of or occupancy or observation, typically by a living organism that can take advantage of or be affected in some desired manner by the light emitted from the device. However, a lighting device may provide light for use by automated equipment, such as sensors/monitors, robots, etc. that may occupy or observe the illuminated space, instead of or in addition to light provided for an organism. A lighting device, for example, may take the form of a lamp, light fixture or other luminaire that incorporates a source, where the source by itself contains no intelligence or communication capability (e.g. LEDs or the like, or lamp ("regular light bulbs") of any suitable type) and the associated spatial modulator. Alternatively, a fixture or luminaire may be relatively dumb but include a source device (e.g. a "light bulb") that incorporates the intelligence and spatial modulation capabilities discussed herein. In most examples, the lighting device(s) illuminate a service area to a level useful for a human in or passing through the space, e.g. regular illumination of a room or corridor in a building or of an outdoor space such as a street, sidewalk, parking lot or performance venue. However, it is also possible that one or more lighting devices in or on a particular premises served by a system of lighting devices have other lighting purposes, such as signage for an entrance or to indicate an exit. Of course, the lighting devices may be configured for still other purposes, e.g. to benefit human or non-human organisms or to repel or even impair certain organisms or individuals. The actual source in each lighting device may be any type of artificial light emitting unit.

The lighting devices discussed by way of examples below generally provide configurable artificial lighting, typically in support of any one of a number of possible general lighting applications for a luminaire of the like. Hence, a number of the examples below include one or more non-imaging type light sources that do not generate a visible image representation of information as might otherwise be perceptible to a person observing the generated light. The modulated light output in the examples will provide a selected illumination light distribution, for a general lighting application.

The term "coupled" as used herein refers to any logical, physical, optical or electrical connection, link or the like by which forces, energy, signals or other actions produced by one system element are imparted to another "coupled" element. Unless described otherwise, coupled elements or devices are not necessarily directly connected to one another and may be separated by intermediate components, elements or communication media that may modify, manipulate or carry the signals. The "coupled" term applies both to optical coupling and to electrical coupling. For example, the controllable optical modulator is coupled by any of various available optical techniques to receive and modulate light output from the source, whereas a processor or the like may be coupled to control and/or exchange instructions or data with other elements of a device or system via electrical connections, optical connections, electromagnetic communications, etc.

Reference now is made in detail to the examples illustrated in the accompanying drawings and discussed below.

FIGS. 1A and 1B are high-level functional block diagrams of various lighting devices 100A, 100B. As a general overview, a lighting device 100 may include a light source 110, an optical modulator 130 for modulating the light output of light source 110, and one or more lenses 150. Additional details regarding lighting device 100 are set forth below.

Light source 110 outputs light. In these examples, light source 110 typically is a non-imaging type of light source, e.g. not an imaging source that might provide display or other similar image-based output functionalities. Nonetheless, virtually any source of artificial light may be used as the source 110. A variety of suitable light generation sources are indicated below.

Suitable light generation sources for use as light source 110 include various conventional lamps, such as incandescent, fluorescent or halide lamps; one or more light emitting diodes (LEDs) of various types, such as planar LEDs, micro LEDs, micro organic LEDs, LEDs on gallium nitride (GaN) substrates, micro nanowire or nanorod LEDs, photo pumped quantum dot (QD) LEDs, micro plasmonic LED, micro resonant-cavity (RC) LEDs, and micro photonic crystal LEDs; as well as other sources such as micro super luminescent Diodes (SLD) and micro laser diodes. Of course, these light generation technologies are given by way of non-limiting examples, and other light generation technologies may be used to implement the source 110.

Light source 110 may use a single emitter to generate light, or light source 110 may combine light from some number of emitters that generate the light. A lamp or 'light bulb' is an example of a single source; an LED light engine may provide a single output for a single source but typically combines light from multiple LED type emitters within the single engine. Many types of light sources provide an illumination light output that generally appears uniform to an observer, although there may be some color or intensity striations, e.g. along an edge of a combined light output. For purposes of the present examples, however, the appearance of the light source output may not be strictly uniform across the output area or aperture of the source 110. For example, although the source 110 may use individual emitters or groups of individual emitters to produce the light generated by the overall source 110; depending on the arrangement of the emitters and any associated mixer or diffuser, the light output may be relatively uniform across the aperture or may appear pixelated to an observer viewing the output aperture. The individual emitters or groups of emitters may be separately controllable, for example to control intensity or color characteristics of the source output. As such, the non-imaging source 110 may or may not be pixelated for control purposes. Even if pixelated for appearance and control purposes, the emitter arrangement and the attendant control need not produce a perceptible image like a display in the output of the source 110 and/or via the distributed output of the lighting device 100. In some non-display example, the pixelated output of the source 110 and/or of the device 100 for luminaire distribution emulation may provide a visible light pattern, such as a static or variable color mosaic.

Light source 110 may output light to a lens 112, as shown in FIGS. 1A and 1B. Lens 112 is coupled to receive and redirect light from light source 110 toward optical modulator 130. In the example shown in FIGS. 1A and 1B, lens 112 is a positive lens, i.e., a lens that focuses or converges light passing therethrough. The extent to which lens 112 focuses the light passing therethrough is dependent on the focal length of lens 112. It will be understood that other structures may be used for redirecting light toward optical modulator 130, for example by reflection, refraction, or diffraction. For another example, lens 112 may be a total internal reflection (TIR) lens which receives and redirects light in order to focus the light from light source 110 onto optical modulator 130.

In addition to lens 112, a substrate 114 may be provided between lens 112 and optical modulator 130. As shown in FIGS. 1A and 1B, substrate 114 fills the space between lens 112 and optical modulator 130. Substrate 114 may be provided, for example, to promote coupling of light from lens 112 to optical modulator 130, and/or prevent unintended reflection of light from lens 112 by the surface of optical modulator 130. As such, substrate 114 may be formed from the same or similar material as optical modulator 130, such as glass, for example. Other suitable materials include transparent plastic material such as acrylic materials or polycarbonate materials. Additionally, an anti-reflective coating may be applied to substrate 114 if there is a distance between lens 112 and optical modulator 130 in order to reduce reflective loss.

Optical modulator 130 is coupled to receive and spatially modulate light redirected by lens 112. A variety of suitable modulators, and several examples of spatial modulation techniques, are described in detail below. The type of modulator 130 chosen for use with the particular light source 110 enables the modulator 130 to optically, spatially modulate the light output from the source 110 to distribute the light onto lenses 150.

Examples of controllable optical modulators that may be used as modulator 130 include electrowetting based dynamic optical beam control, micro/nano-electro-mechanical systems (MEMS/NEMS) based dynamic optical beam control optics, electrochromic gradient based control, microlens based passive beam control, passive control using segment control (y-y area and pixels), holographic films, switchable diffusers and/or gratings, and lens or microlens arrays based on liquid crystal materials. Of course, these modulation technologies are given by way of non-limiting examples, and other modulation techniques may be used to implement modulator 130. The optical modulator technology, the number of elements/cells/pixels of the optical modulator 130, and/or the arrangement of the optical modulator 130 relative to the light source 110 and/or lens 112 for a given implementation of the device 100 may be chosen so that the modulated light output selectively achieves various possible luminaire output distributions.

In one example, optical modulator 130 utilizes electrowetting to spatially modulate light from light source 110. Electrowetting is a fluidic phenomenon that enables changing of the configuration of a contained fluid system in response to an applied voltage. In general, application of an electric field modifies the wetting properties of a surface, typically a hydrophobic surface, in the fluid system. Examples of electrowetting optics use two immiscible fluids having different electrical properties. In at least some examples, the two fluids have different indices of refraction. One fluid may be conductive. The other fluid may be non-conductive. Both the conductive and non-conductive fluids may be adjacent to the hydrophobic surface, with the conductive fluid also in contact with an electrode, which normally is not hydrophobic. The conductive fluid may be a transparent liquid, but the other fluid may be reflective, transparent, or transmissive with a color tint. Where both liquids are transparent or transmissive, the non-conductive fluid may exhibit a higher index of refraction than the conductive fluid. In such a transmissive optic example, changing the applied electric field changes the shape of the fluid interface surface between the two liquids and thus the refraction of the light passing through the interface surface. If the interface surface is reflective (e.g. due to reflectivity of one of the liquids or inclusion of a reflector at the fluid interface), changing the applied electric field changes the shape of the reflective interface surface and thus the steering angle of the light reflected at the interface surface. Depending on the application for the electrowetting optic, the light may enter the fluid system to pass first through either one or the other of the two liquids.

The present lighting devices 100 can use a variety of different types of electrowetting optics, for example, including various types of transmissive electrowetting optics and various types of reflective electrowetting optics.

A transmissive electrowetting optic bends or shapes light passing or transmitted through the electrowetting optic. The degree of bending or shaping varies with the angle or shape of the fluid interface surface in response to the applied electric field. Transmissive optics, for example, can take the form of a variable shaped lens, a variable shaped prism, combinations of prism and lens optics, or even a variable shaped grating formed by a wavefront across the interface surface.

By contrast, a reflective electrowetting optic reflects light, and the angular redirection and/or shaping of the reflected light varies with the angle or shape of the fluid interface surface in response to the applied electric field. The two-liquid system may be controlled like a prism, e.g. in front of a mirror surface within the optic. Alternatively, the system may be configured such that the variable shaped surface itself is reflective.

Electrowetting optics are a useful technology for implementing controllable beam steering and/or beam shaping for software configurable lighting devices. However, for lighting devices, there may be a need for relatively large beam steering angles. In a two-liquid electrowetting optic, the optical path is related to the refractive indices of liquids that are used. Typically oil and saline are used in combination for the electrowetting optic, however, the refractive index of oil limits the maximum deflection angle that can be achieved. In addition, a large beam steering angle requires large contact angle between oil and water, which requires higher operating voltage. Accordingly, the configurable lighting devices described herein utilize one or more lenses 150 in combination with an electrowetting modulator in order to increase the maximum steering angle that can be achieved.

For convenience, FIGS. 1A and 1B show an arrangement of the light source 110 and the spatial modulator 130 that corresponds most closely to use of a transmissive type modulator, where the modulator passes light through but modulates distribution of the transmitted light. Similar arrangements are shown for convenience in several of the later drawings, as well. Those skilled in the art will appreciate that other types of source/modulator arrangements may be used, for example, in which the modulator reflects light instead of or in addition to transmissive passage of the light being spatially modulated.

One or more lenses 150 are coupled to receive and redirect light modulated by optical modulator 130. The positioning of lens or lenses 150 may optionally be determined based on the focal length of the positive lens 112. FIGS. 1A and 1B show two different examples of implementations of the one or more lenses 150. In the example shown in FIG. 1A, a pair of lenses 150A is positioned at a distance from lens 112 that is approximately equal to the focal length of lens 112. In the second example shown in FIG. 1B, a wide angle lens such as a fisheye lens 150B is positioned at a distance from lens 112 that is approximately equal to the focal length of lens 112. Other suitable lens configurations may be used to implement the one or more second lenses 150 in devices similar to 100A, 100B in these first two drawings. Nonetheless, it will be understood that the distance between lens 112 and lenses 150A or 150B can change depending on the output optical performance required by the lighting device, and/or on the geometry of lenses 150A or 150B. The direction and extent of the redirection caused by lenses 150 is dependent on the spatial position at which the modulated light contacts lenses 150.

Lenses 150A in FIG. 1A are illustrated as plano-convex. The examples shown in the drawings and described herein, however, are not so limited. Lenses having any curvature, including concave or bio-convex lenses, may be used to steer light from modulator 130. In the alternative example shown in FIG. 1B, a single spherical or aspherical fisheye lens may be used as lens 150B. The selection of a geometry for the one or more second lenses 150 may be made based on the desired steering properties for the lens(es). The direction and extent of the redirection caused by lenses 150 may be determined based on the geometry and positioning of lenses 150 relative to optical modulator 130.

FIG. 2 provides an example of a controller 160 that may be used in a configurable lighting device. Controller 160 is configured to drive light source 110 and/or spatial modulator 130 to provide a selected light output distribution, e.g. for a general illumination application. As a general overview, controller 160 includes a driver system 162, a host processing system 164, one or more communication interface(s) 166, and one or more sensors 168.

The host processing system 164 provides the high level logic or "brain" of the device 100. In the example, the host processing system 164 includes data storage/memories 170, such as a random access memory and/or a read-only memory, as well as programs 172 stored in one or more of the data storage/memories 170. The data storage/memories 170 store various data, including lighting device configuration information 173 or one or more configuration files containing such information, in addition to the illustrated programming 172. The host processing system 164 also includes a central processing unit (CPU), shown by way of example as a microprocessor (µP) 174, although other processor hardware may serve as the CPU.

The ports and/or interfaces 176 couple the processor 174 to various other elements of the device 100, such as the driver system 162, the communication interface(s) 166 and the sensor(s) 168. For example, the processor 174 by accessing programming 172 in the memory 170 controls operation of the driver system 162 and other operations of the lighting device 100 via one or more of the ports and/or interfaces 176. In a similar fashion, one or more of the ports 176 enable the processor 174 of the host processing system 168 to use and communicate externally via the interfaces 166; and the one or more of the ports 176 enable the processor 174 of the host processing system 168 to receive data regarding any condition detected by a sensor 168, for further processing.

In the examples, based on its programming 172, the processor 174 processes data retrieved from the memory 170 and/or other data storage, and responds to light output parameters in the retrieved data to control light source 110 and optical modulator 130. The light output control also may be responsive to sensor data from a sensor 168. The light output parameters may include light intensity and light color characteristics in addition to spatial modulation (e.g. steering and/or shaping and the like for achieving a desired spatial distribution).

As noted, the host processing system 164 is coupled to the communication interface(s) 166. In the example, the communication interface(s) 166 offer a user interface function or communication with hardware elements providing a user interface for the device 100. The communication interface(s) 166 may communicate with other control elements, for example, a host computer of a building control and automation system (BCAS). The communication interface(s) 166 may also support device communication with a variety of other systems of other parties, e.g. the device manufacturer for maintenance or an on-line server for downloading of virtual luminaire configuration data.

The host processing system 164 also is coupled to the driver system 162. The driver system 162 is coupled to the light source 110 and the optical modulator 130 to control one or more operational parameter(s) of the light output generated by the source 110 and to control one or more parameters of the modulation of that light by the optical modulator 130. Although the driver system 162 may be a single integral unit or implemented in a variety of different configurations having any number of internal driver units, the example of system 162 includes a light source driver circuit 178 and a spatial modulator driver 180. The drivers 178, 180 are circuits configured to provide signals appropriate to the respective type of source 110 and/or modulator 130 utilized in the particular implementation of the device 100, albeit in response to commands or control signals or the like from the host processing system 164.

The host processing system 164 and the driver system 162 of controller 160 provide a number of control functions for controlling operation of the lighting device 100. In a typical example, execution of the programming 172 by the host processing system 164 and associated control via the driver system 162 configures the lighting device 100 to perform functions, including functions to operate the light source 110 to provide light output from the lighting device and to operate the optical modulator 130 to steer and/or shape the light output from the source 110 and/or redirected by lens 112 so as to create a selected distribution of the light on lenses 150. By changing the distribution of the light on lenses 150, controller 160 may emulate a lighting distribution of a selected one of a number of types of luminaire, based on the lighting device configuration information 173.

Apparatuses implementing functions like those of device 100 may take various forms. In some examples, some components attributed to the lighting device 100 may be separated from the light source 110 and the optical modulator 130. For example, an apparatus may have all of the above hardware components on a single hardware device as shown or in different somewhat separate units. In a particular example, one set of the hardware components may be separated from the light source 110 and the optical modulator 130, such that the host processing system 164 may run several similar systems of sources and modulators from a remote location. Also, one set of intelligent components, such as the microprocessor 174, may control/drive some number of driver systems 162 and associated light sources 110 and optical modulators 130. It also is envisioned that some lighting devices may not include or be coupled to all of the illustrated elements, such as the sensor(s) 168 and the communication interface(s) 117. For convenience, further discussion of the devices 100 of FIGS. 1A, 1B, and 2 will assume an intelligent implementation of the device that includes at least the illustrated components.

In addition, the device 100 is not size restricted. For example, each device 100 may be of a standard size, e.g., 2-feet by 2-feet (2×2), 2-feet by 4-feet (2×4), or the like, and arranged like tiles for larger area coverage. Alternatively, the device 100 may be a larger area device that covers a wall, a part of a wall, part of a ceiling, an entire ceiling, or some combination of portions or all of a ceiling and wall.

In an operation example, the processor 174 receives a configuration file 173 via one or more of communication interfaces 166. The configuration file 173 indicates a user selection of a virtual luminaire light distribution to be provided by the configurable lighting device 100. The processor 174 may store the received configuration file 173 in storage/memories 170. Each configuration file includes software control data to set the light output parameters of the software configurable lighting device 100 at least with respect to optical spatial modulation. The configuration information in the file 173 may also specify operational parameters of the light source 110, e.g. illumination related parameters such as light intensity, light color characteristic and the like. The processor 174 by accessing programming 172 and using software configuration information 173, from the storage/memories 170, controls operation of the driver system 162, and through that system 162 controls the light source 110 and the optical modulator 130. For example, the processor 174 obtains spatial distribution control data from a configuration file 173, and uses that data to control the modulation driver 180 to cause modulator 130 to optically spatially modulate output of the light source 110 to direct the light to a selected region of lenses 150, in order to cause lenses 150 to redirect the modulated light and produce a selected light distribution. In this way, the configurable lighting device 100 achieves a user selected light distribution for a general illumination application of a luminaire, e.g. selected from among any number of luminaire emulations within the operational capabilities of the lighting device 100.

FIG. 3 illustrates an example of a LED type light engine 210, serving as the light source, a spatial modulator 230, and lenses 250 for use in a luminaire or other type of configurable lighting device. Depending on the configuration of the LED based light engine 210 and the spatial modulator 230, the light output from engine 210 may be supplied directly to an optical input of the spatial modulator 230. As an option, however, the device/system of FIG. 3 may further include a light coupling element 214 to enhance the coupling of the light output from the LED based light engine 210 to the optical input of the spatial modulator 230. Examples of such a coupling element 214 include one or more lenses (such as lens 112 in FIGS. 1A and 1B) and/or one or more substrates (such as substrate 114 in FIGS. 1A and 1B).

For general lighting applications, many manufacturers have developed LED sub-assemblies referred to as "LED light engines" that are readily adaptable to use in various luminaires. The light engine typically includes some number of LEDs that together produce a specified lumen output of a specified color characteristic or controllable range thereof, e.g. white light of a particular value or range for CRI or R9. The light engine also includes the supporting circuit board, heat sink and any additional housing for the LEDs. The light engine may also include a diffuser and/or the driver circuitry appropriate to provide drive current to the LEDs of the light engine. Any of a wide range of LED light engine designs may be used in an implementation of a software configurable lighting device. In such an example, a LED based light engine 210 produces light output, which is coupled to the spatial modulator 230.

In this example, one such spatial modulator 230 modulates the entire cross-section of the output of the light from the LED light engine 210. In such an implementation, the spatial modulator 230 may be a single controllable device extending across the output aperture of the LED based light engine 210, in which case drive of the one modulator 230 causes the modulator 230 to implement an integral controllable steering or shaping of the entire output of the LED based light engine 210.

Alternatively, the spatial modulator 230 may be subdivided into pixels, e.g. in a matrix array arrangement extending across the output aperture of the LED based light engine 210, in which case different individual or sub-modulators at the pixels of the array spatially modulate different portions of the light output from the LED based light engine 210. If the associated driver (e.g. 180 in FIG. 2) individually controls the pixels of such a spatial modulator 230 different beam outputs from the LED based light engine 210 can be independently shaped or steered. Each pixel may include its own lens or lenses 250 for further redirecting light from modulator 230. As used herein, pixels refer to individually controllable units or cells in a matrix or array, for example, together forming the optical spatial modulator 230, as opposed to individual points in a picture or other type of image. In this example, the modulated light output of the overall device, from the output of pixel array implementation of the spatial modulator 230 and lenses 250, provides the selected illumination light distribution, for a general lighting application. The spatial modulator 230 may use any of the modulation technologies outlined earlier, either to implement a single modulator device across the aperture or to implement any or all of the pixels of an array of modulator cells.

As discussed above relative to FIG. 2, the distributed output of the device/system of FIG. 3, from the modulator 230, provides a light distribution on lenses 250 that results in the emulation of a distribution of a luminaire for a general lighting application. Since the modulator 230 is controllable, e.g. by a host processing system or other type of controller, the distribution may be selected to emulate any desired luminaire distribution within the range of capabilities of the particular modulator design used for element 230 of the device.

The redirection of light from each pixel using lenses 250 is dependent on the arrangement of the lenses. FIGS. 4A-4E show different layouts of lenses, or multi-lens arrangements, for achieving selected lighting distributions with the light from the optical modulator. These lens arrangements may be provided on a pixel by pixel basis as described above, resulting in an array of lenses.

Figure 4B:
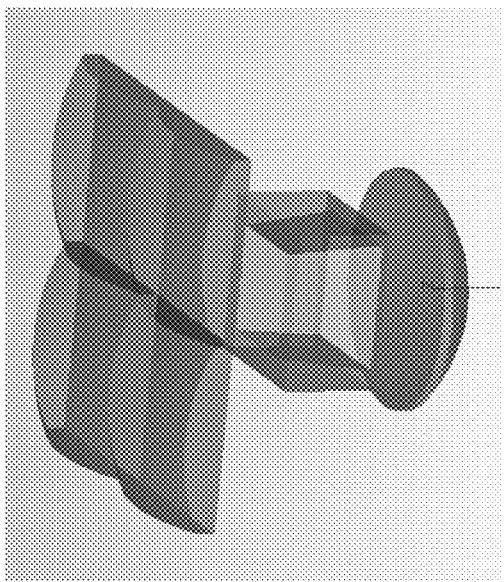
FIGS. 4A-4E are diagrams of different layouts for lenses of a configurable lighting device, system, or apparatus.
Figure 4D:
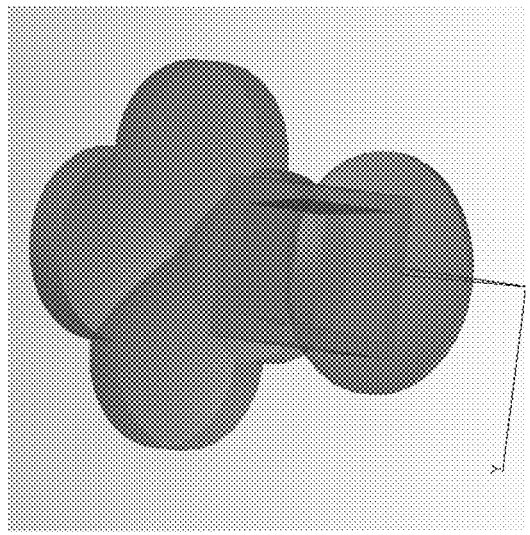
Figure 4A:
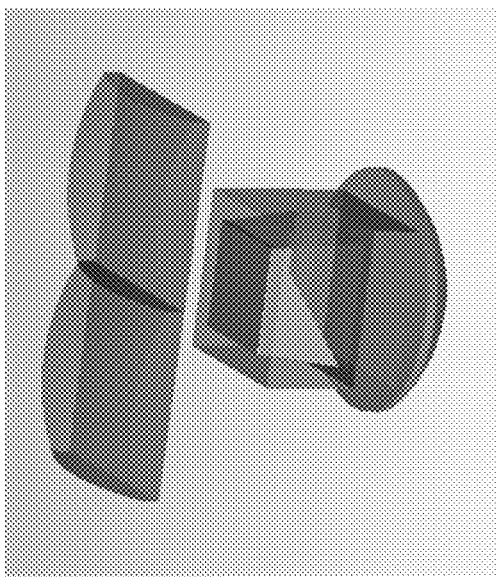

FIG. 4A shows a pair of lenses. The use of a pair of lenses allows for one-dimensional steering of light from the light source, along the direction in which the pair of lenses are aligned. The common edge of the lenses (i.e., the line along which they contact one another) intersects the optical axis of the optical modulator, such that the pair of lenses are "centered" above the modulator. This orientation may provide the largest lens area onto which the optical modulator can distribute the light.

Figure 4C:
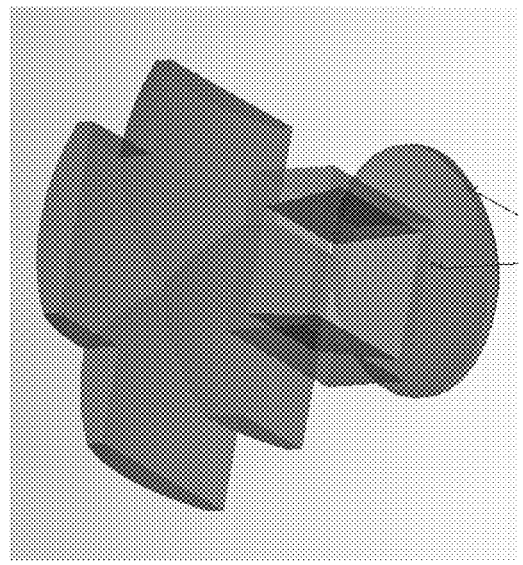

FIGS. 4B, 4C, and 4D show four lenses, generally arranged in a 2×2 array. The use of a 2×2 array of lenses allows for two-dimensional steering of light from the light source. The center of each 2×2 array of lenses falls on the optical axis of the optical modulator, such that the array of lenses is "centered" above the modulator. This orientation may provide the largest lens area onto which the optical modulator can distribute the light.

Figure 4E:
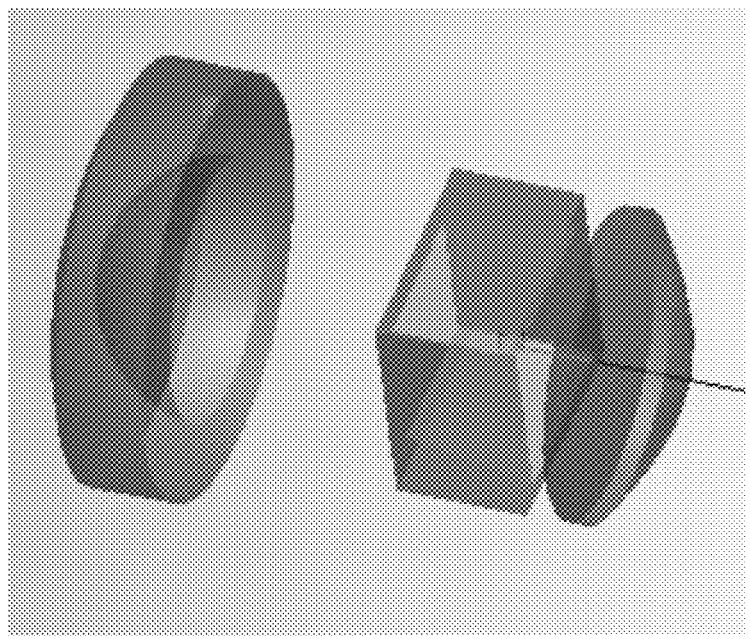

FIG. 4E shows a single spherical or aspherical fisheye lens, similar to the lens 150B in FIG. 1B discussed above. The use of a fisheye lens allows for a wide range of two-dimensional steering or light without the associated problems of interference caused by some multi-lens arrangements. The center of the fisheye lens falls on the optical axis of the optical modulator, such that the fisheye lens is "centered" above the modulator.

While the lenses in these diagrams are shown sharing a common edge, this illustration is not intended to be limiting. The lenses may alternatively be spaced from one another. The lenses may also be stacked one on top of the other, such that the light passes through multiple lenses. Other orientations of lenses besides those shown will be apparent to one of ordinary skill in the art from the description herein. Likewise, the lenses are not limited to the shapes illustrated in FIGS. 4A-4D, but may have any shape such as circular, elliptical, rectangular, square, etc.

As set forth above, the lighting devices described may use different types of electrowetting optics as the controllable optical modulator 130. Examples of electrowetting optics are illustrated in FIGS. 5A and 5B, and are described below.

Figure 5A:
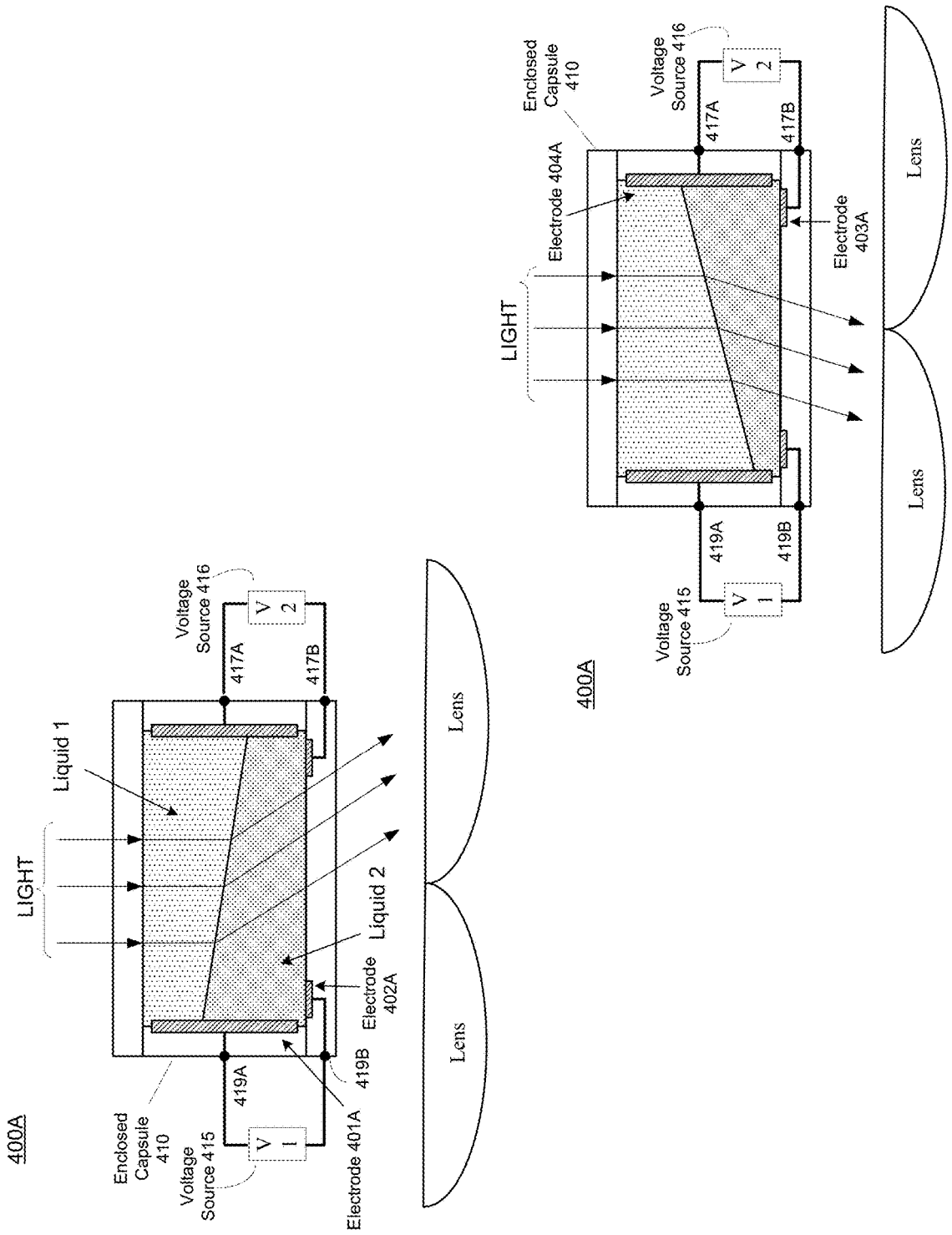
FIGS. 5A and 5B are cross-sectional diagrams of electrowetting optical modulators of a configurable lighting device, system, or apparatus.
Figure 5B:
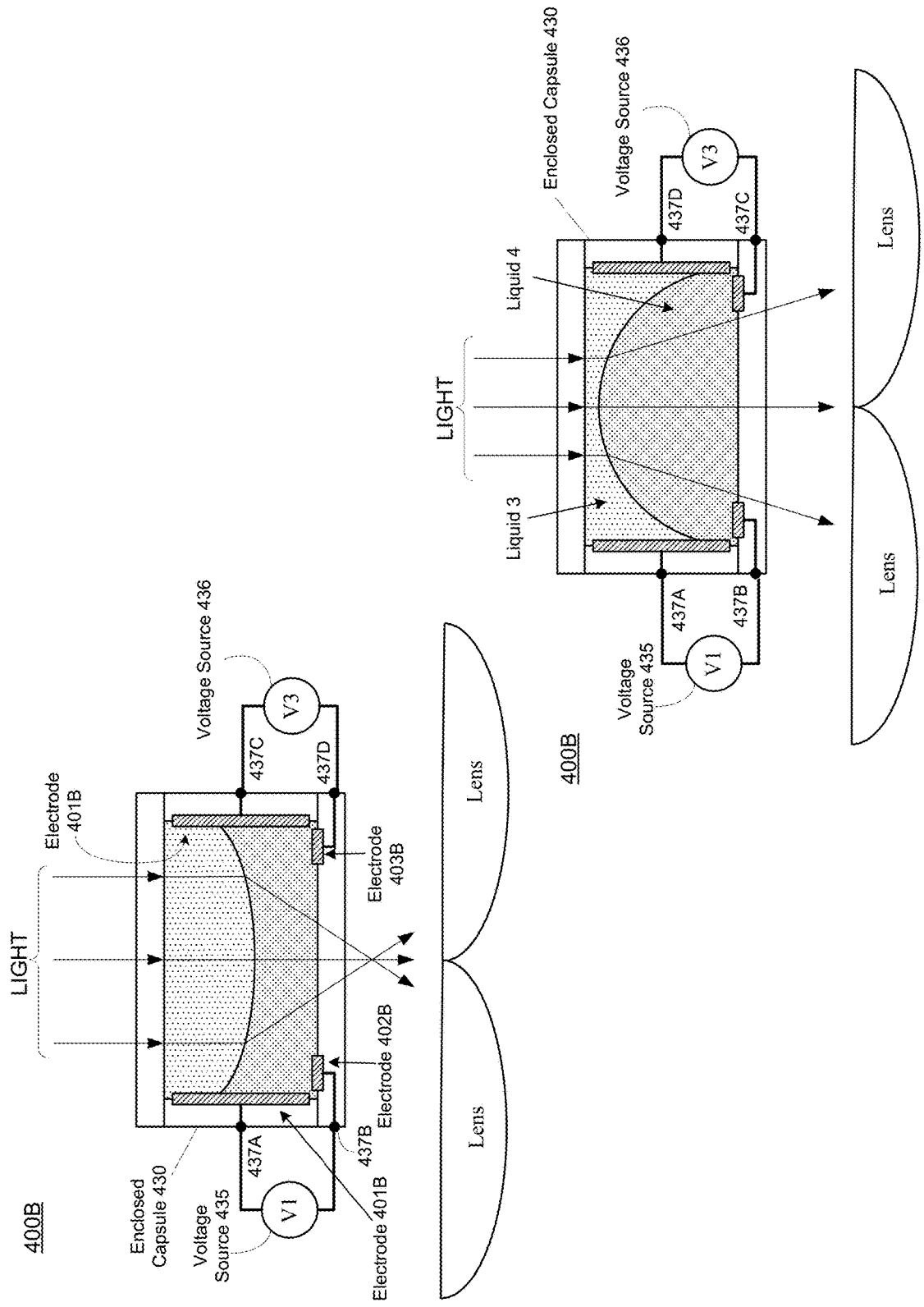

As shown in FIGS. 5A and 5B, an optical modulator is controllable in response to control voltages to spatially modulate light from the light source. For example, the spatial modulator 400A may process input light by deflecting (i.e., refracting) the inputted light, while the spatial modulator 400B processes input light by shaping the beam of light. In other words, each spatial modulator 400A or 400B may act as a lens that processes input light according to control signals.

FIG. 5A illustrates an electrically controllable liquid prism lens within enclosed capsule 410. The ray tracings are provided to generally illustrate the beam steering and beam shaping concepts and are not intended to indicate actual performance of the illustrated electrically controllable liquid prism lens. The enclosed capsule 410 is configured with one or more immiscible liquids (e.g., Liquid 1 and Liquid 2) that are responsive to an applied voltage from voltage source 415. For example, the liquids 1 and 2 may an oil and water, respectively, or some other combination of immiscible liquids that are electrically controllable. The desired spatial distribution effects are provided based on liquid 1 having a higher index of refraction than the index of refraction of liquid 2. The enclosed capsule 410, which has a physical shape of a cube or rectangular box, retains the liquids 1 and 2 to provide an electrically controllable liquid prism lens. The enclosed capsule 410 includes terminals 417A, 417B, 419A and 419B that are coupled to electrodes 401A, 402A, 403A and 404A, respectively.

As shown in the example of FIG. 5A, the modulator 400A has a first state in which the voltage source 415 outputs a voltage V1 that is applied across terminals 419A and 419B and the voltage source 426 outputs a voltage V2 that is applied across terminals 417A and 417B. The voltage V1 applied to electrodes 401A and 402A and voltage V2 applied to electrodes 403A and 404A causes the liquids 1 and 2 to assume the first state shown on the left side of FIG. 5A. As shown, the input light is deflected toward the right side of the second lenses in the first state. On the bottom right side of FIG. 5A, an example illustrates the output light deflection when modulator 400A is in a second state. The modulator 400A achieves the second state when the combination of voltages V1 and V2 is applied by voltage sources 415 and 416. The modulator 400A in the second state deflects the light in a direction opposite that of when the modulator is in the first state. Modulator 400A may achieve other states based on the input voltage, such as a state in which voltage is applied to the two liquids to achieve a certain meniscus (e.g. a meniscus that makes the electrowetting optics work as a plano lens), so that the light passes directly through the spatial modulator 400A substantially without deflection. Examples of other states resulting from different applied voltages include states achieving somewhat greater deflection than the state of FIG. 5A (further to the right in that illustration), somewhat greater deflection than the state of FIG. 5B (further to the left in that illustration), or deflections in the range between the two illustrated states. Hence, the angle of the deflection may be manipulated by adjusting the voltages applied by voltage sources 415 and 416. The voltages V1 and V2 may or may not be equal; they may be applied simultaneously at different values to achieve a particular state between the first and second states. Although the voltages V1 and V2 are described as being applied simultaneously, the voltage V1 and V2 may be applied separately.

The spatial modulator 400B of FIG. 5B illustrates an electrically controllable lens having a beam shaping capability. The ray tracings are provided to generally illustrate the beam steering and beam shaping concepts and are not intended to indicate actual performance of the illustrated electrically controllable liquid prism lens. The modulator 400B, like modulator 400A, is configured with one or more immiscible liquids (e.g., Liquid 3 and Liquid 4) that are responsive to an applied voltage from voltage sources 415 and 416. For example, the liquids 3 and 4 may an oil and water, respectively, or some other combination of immiscible liquids that are electrically controllable. The desired spatial distribution effects are provided based on liquid 3 having a higher index of refraction than the index of refraction of liquid 4. In the illustrated example, the liquid 3 has a higher index of refraction than liquid 4. Although the enclosed capsule 430 is shown as a rectangular box, the enclosed capsule 430 may have the physical shape of a cube, a cylinder, ovoid or the like. The enclosed capsule 430 retains liquids 3 and 4, and is also configured with electrodes 401B and 402B that surround the periphery of the enclosed capsule 430. By surrounding the periphery of the enclosed capsule 430, voltages applied to the electrodes 401B-404B cause the liquids 3 and 4 to form a lens that provides beam shaping processing of the input light. Terminals 437A and 437B allow voltage source 435 to be connected to the modulator 400B. As shown on the top left side of FIG. 5B, the voltage source 435 applies a voltage V1 across the terminals 437A and 437B. In response to the applied voltages V1 and V3 the liquids 3 and 4 react to provide a concave shaped lens as in the first state. Input light from the light source (not shown) is processed based on control signals indicating the voltage to be applied by the voltage sources 435 and 436 to provide a shaped beam that focuses the light at a point the locus of which is electrically controllable.

The modulator 400B is further configurable to provide beam dispersion. As shown in the bottom right side of FIG. 5B, the modulator 400B based on applied voltages V1 and V3 forms a convex lens, shown as the second state, that disperses the input light. In particular, the voltage source 435 applies voltage V1 across terminals 437A and 437B, which is then applied to electrodes 401B and 402B. Similarly, the voltage source 436 applies a voltage V3 that is applied across terminals 437C and 437D that is provided to electrodes 403B and 4044B. The voltage V1 applied to electrodes 401B and 402B and the voltage V3 applied to electrodes 403B and 404B causes the liquids 3 and 4 to react to assume the second state shown on the lower right in FIG. 5B. Depending upon the voltages applied by voltage sources 435 and 436 to the respective electrodes, other states between those shown may also be attained.

The beam steering functions of FIG. 5A and the beam shaping functions of FIG. 5B are described separately for ease of explanation; however, the functions and capabilities described and illustrated with reference to FIGS. 5A and 5B may be combined in a single electrowetting optic to provide a combined electrowetting optic that is capable of simultaneously beam steering and beam shaping, separately providing beam steering or separately providing beam shaping. By applying different voltages to the respective electrodes, the simultaneous electrically controllable beam steering and beam shaping may be provided.

Figure 6A:
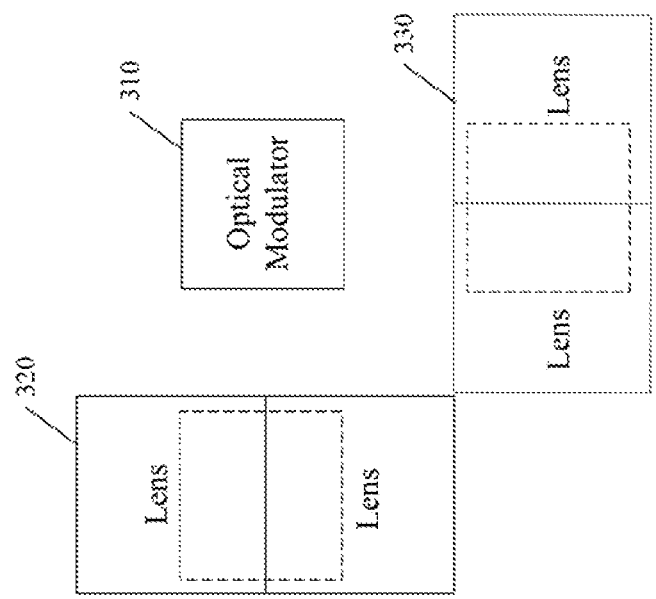
FIG. 6A is a block diagram of a number of components as may form one configurable lighting device or a pixel of an array a configurable lighting device.
Figure 6B:
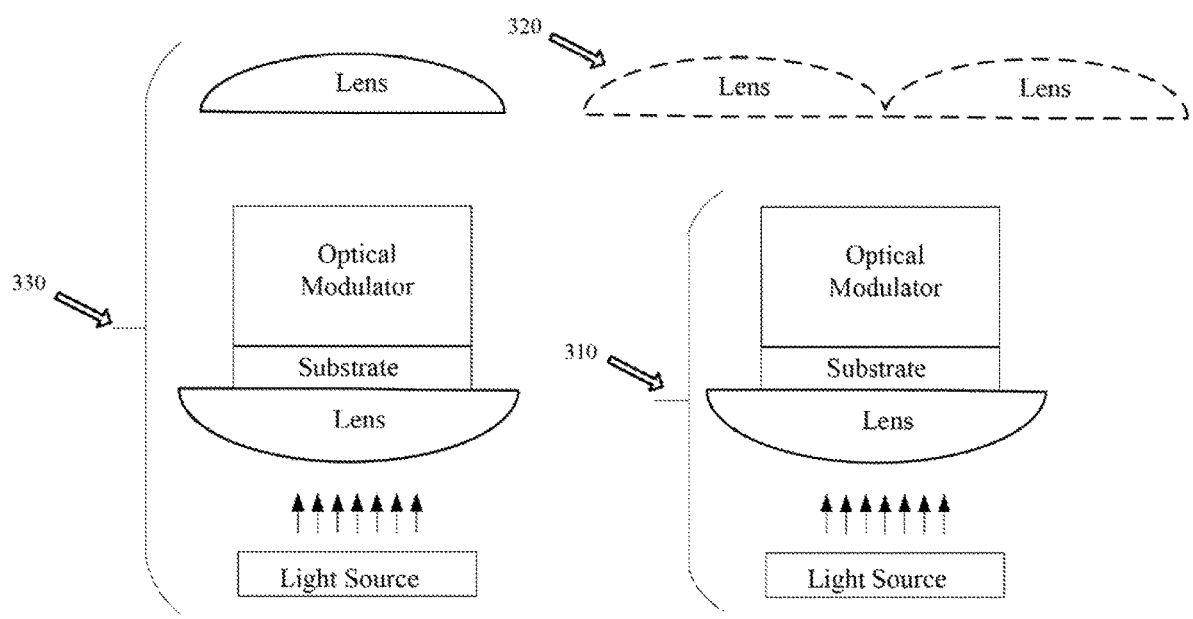
FIG. 6B is a black diagram showing a right side view of the components of FIG. 6A.

As set forth above, the use of a pair of lenses allows for one-dimensional steering of light from the light source. In order to enable steering in two dimensions in an array of pixels (as described above in FIG. 2), adjacent or nearby pixels may be provided with orthogonal pairs of lenses. FIG. 6A shows a top view of an array of three pixels 310, 320, 330 of a configurable lighting device; FIG. 6B shows a right side view thereof. The first pixel 310 includes an optical modulator, but no lens positioned above. As a result, the light from this pixel 310 can be steered only to the extent provided by the optical modulator. In an example in which pixel 310 includes an electrowetting lens as the optical modulator, the light from pixel 310 may be steered up to 9 degrees from the optical center of the pixel 310. The second pixel 320 includes an optical modulator (shown in dashed lines) and a pair of lenses oriented along the vertical direction. The light from this pixel 320 can be steered to a greater degree in the vertical direction, for example, up to 24 degrees from the optical center of pixel 320. The third pixel 330 includes an optical modulator (shown in dashed lines) and a pair of lenses oriented along the horizontal direction. The light from this pixel 330 can be steered to a greater degree in the horizontal direction, for example, up to 24 degrees from the optical center of pixel 330. While pixels 320 and 330 are shown with their optical centers aligned orthogonally, it will be understood that any alignment or angle between the optical centers of each pair of lenses may be selected based on the distribution of light provided from the optical modulator or the lighting distribution to be emulated.

Each pixel 310, 320, 330 may include the optical and control components of lighting devices 100 illustrated in FIGS. 1A, 1B, and 2. Additionally, pixels 310, 320, 33 may be individually controlled according to the description above. Thus, depending on the type of beam steering or shaping required to produce the selected lighting distribution, one or more of pixels 310, 320, 330 could be controlled to produce light, to steer the light, or to not produce light at all.

Figure 7B:
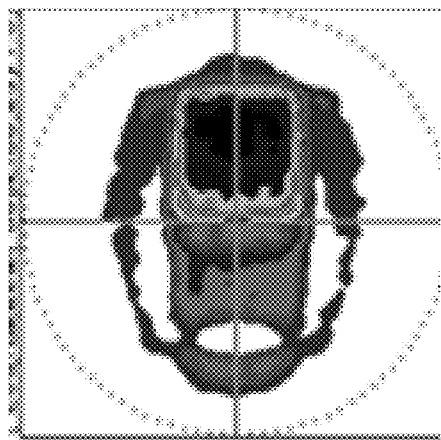
FIGS. 7A-7G are graphs of light output spatial distribution for different examples of lens layouts for a configurable lighting device.
Figure 7D:
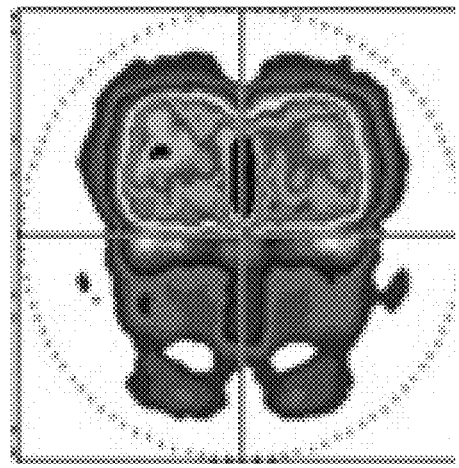
Figure 7A:
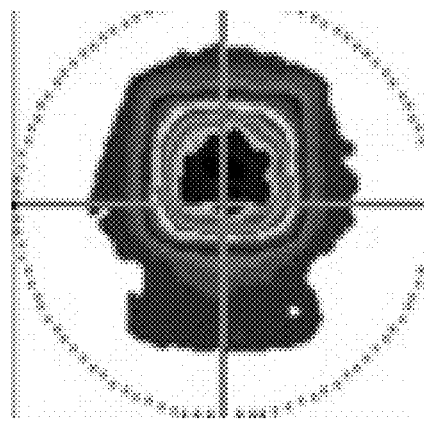
Figure 7C:
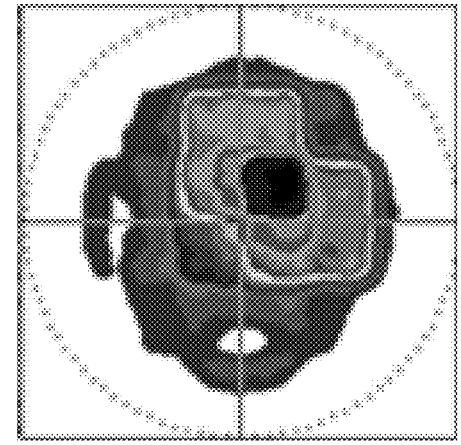
Figure 7F:
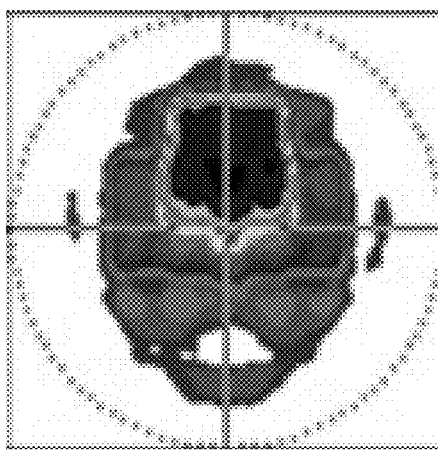
Figure 7E:
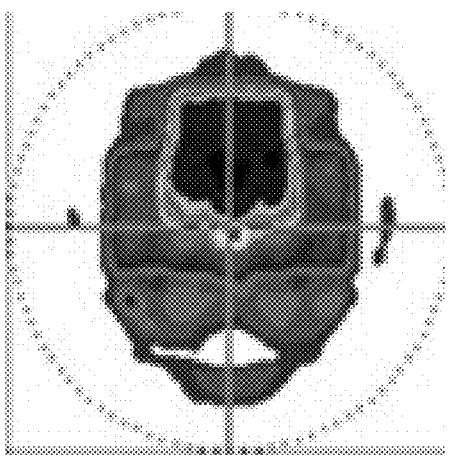
Figure 7G:
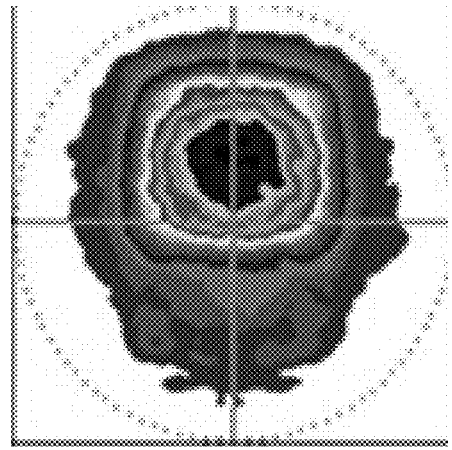

FIGS. 7A-7G are graphs of light output spatial distribution for different examples of lens layouts for a configurable lighting device. These graphs illustrate the potential of various lens layouts for steering the light output from the light source away from the optical axis of the optical modulator. FIG. 7A illustrates the spatial distribution of light for an electrowetting optical modulator without a lens. The maximum light beam steering enabled by this layout is 9°. FIG. 7B illustrates the spatial distribution of light for an optical modulator having a pair of lenses oriented as shown in FIG. 4A. The maximum light beam steering enabled by this layout is 24° in the direction with which the optical centers of the lenses are aligned. FIG. 7C illustrates the spatial distribution of light for two optical modulators having a pair of orthogonally aligned lens, as shown in FIG. 6A. The maximum light beam steering enabled by this layout is 24° in both directions of the lenses, e.g., the x and y directions. FIG. 7D illustrates the spatial distribution of light for an optical modulator having an array of lenses arranged as shown in FIG. 4B; FIG. 7E illustrates the spatial distribution of light for an optical modulator having an array of lenses arranged as shown in FIG. 4C; FIG. 7F illustrates the spatial distribution of light for an optical modulator having an array of lenses arranged as shown in FIG. 4D. The maximum light beam steering enabled by each of these layouts is 20° in both the x and y directions, FIG. 7G illustrates the spatial distribution of light for an optical modulator having a single spherical fisheye lens as shown in FIG. 4E. The maximum light beam steering enabled by this layout is 18° in any direction. It should be understood that the "maximum" light been steering angles set forth above apply to the specific examples shown in the accompanying figures, and are not limiting. Alternative systems may be optimized according to the description herein to achieve even larger steering angles in certain examples.

Figure 8B:
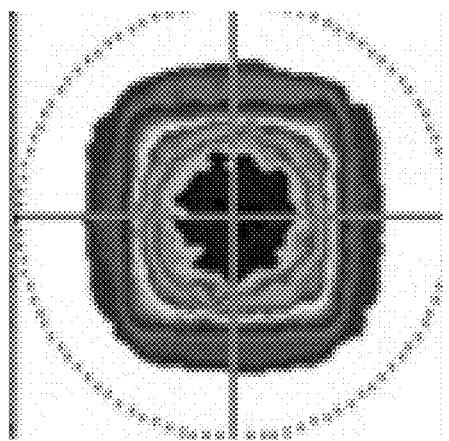
FIGS. 8A-8J are graphs of light output spatial distribution for different examples of lens layouts for a configurable lighting device.
Figure 8D:
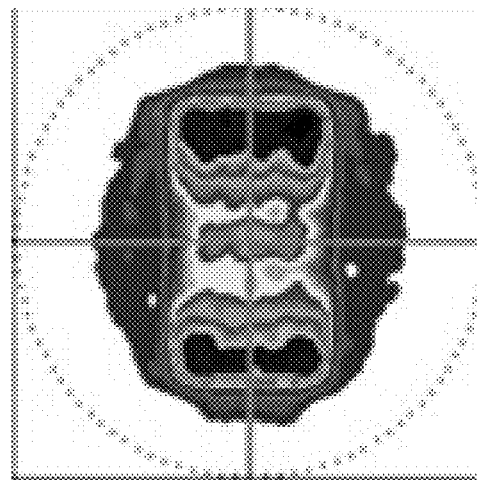
Figure 8A:
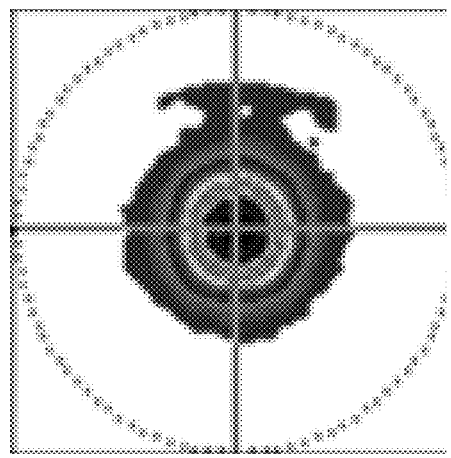
Figure 8C:
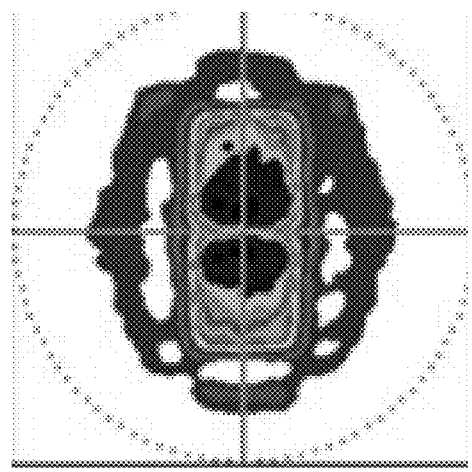
Figure 8F:
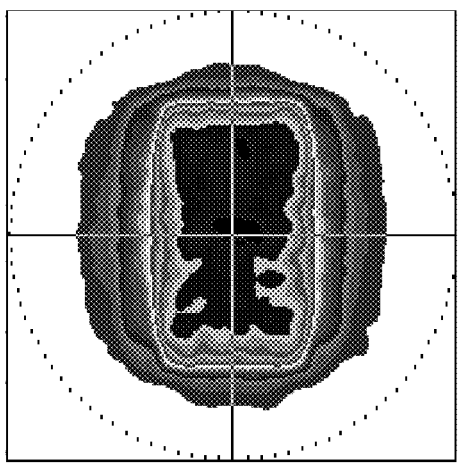
Figure 8H:
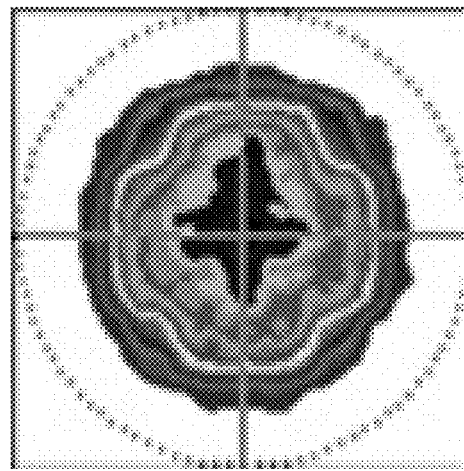
Figure 8E:
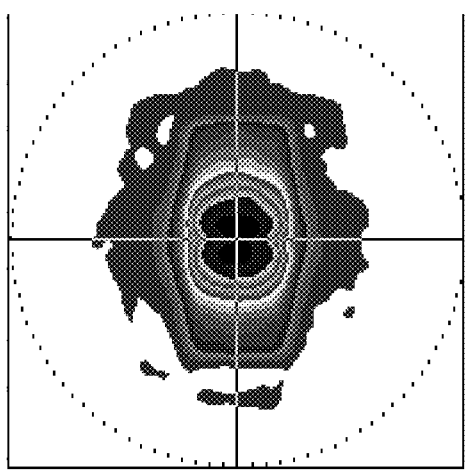
Figure 8G:
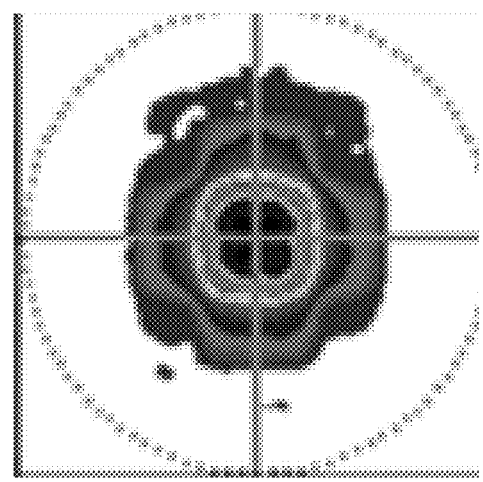
Figure 8J:
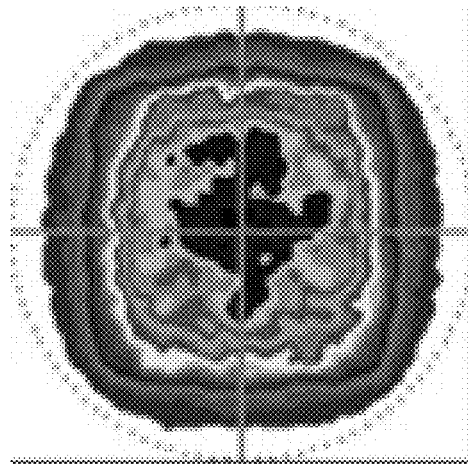
Figure 8I:
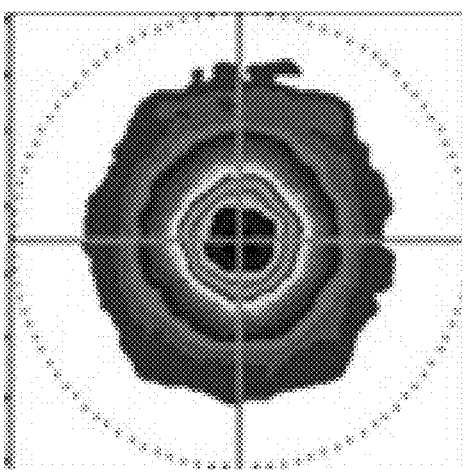

FIGS. 8A-8J are also graphs of light output spatial distribution for different examples of lens layouts for a configurable lighting device. These graphs illustrate the potential of various lens layouts for shaping the light output from the light source, e.g., to have a narrow or wide beam width. FIGS. 8A and 8B illustrate the spatial distribution of light for an electrowetting optical modulator without a lens. FIGS. 8C and 8D illustrate the spatial distribution of light for an optical modulator having a pair of lenses oriented as shown in FIG. 4A. The range of beam shaping enabled by this layout extends from 26° to 50°. As shown in these graphs, the peak intensity of the resulting beam is not at the beam's center. To address this, the paired lens layout of FIGS. 8C and 8D may be combined with the lens-free layout of FIGS. 8A and 8B. FIGS. 8E and 8F illustrate the spatial distribution of light for such a combination. The range of beam shaping enabled by this layout extends from 33° to 70° in the horizontal direction. FIGS. 8G and 8H illustrate the spatial distribution of light for an optical modulator having an array of lenses arranged as shown in FIG. 4D. The range of beam shaping enabled by this layout extends from 30° to 70° in the horizontal and vertical directions, and from 32° to 60° at the corners between the horizontal and vertical directions. FIGS. 8I and 8J illustrate the spatial distribution of light for an optical modulator having a single fisheye lens as shown in FIG. 4E. The range of beam shaping enabled by this layout extends from 32° to 70° in the horizontal and vertical directions, and from 30° to 80° at the corners between the horizontal and vertical directions. While this steering exhibits some asymmetry, it will be understood that the symmetry of the beam shaping angles may be improved, e.g., by using a round optical modulator and/or more electrodes to control the modulation of the light.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," "includes," "including," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "a" or "an" does not, without further constraints, preclude the existence of additional identical elements in the process, method, article, or apparatus that comprises the element.

Unless otherwise stated, any and all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present concepts.

What is claimed is:

1. A configurable lighting device comprising:
   one or more sources of light;
   a first lens coupled to receive and redirect light output from the one or more sources;
   a pair of second lenses;
   a first controllable optical modulator between the first lens and the pair of second lenses coupled to receive and spatially modulate light redirected by the first lens,
   the pair of second lenses being coupled to receive and redirect light modulated by the first controllable optical modulator, and the pair of second lenses having optical centers aligned in a first direction;
   a third lens coupled to receive and redirect light output from the one or more sources;
   a pair of fourth lenses;
   a second controllable optical modulator between the third lens and the pair of fourth lenses coupled to receive and modulate light redirected by the third lens;
   the pair of fourth lenses being coupled to receive and redirect light modulated by the second controllable optical modulator, and the pair of fourth lenses having optical centers aligned in a second direction different from the first direction
   wherein the first optical modulator is selectively controllable to steer and/or shape the light redirected by the first lens to a selected distribution of the light on the pair of second lenses, and
   wherein the second optical modulator is selectively controllable to steer and/or shape the light redirected by the third lens to a selected distribution of the light on the pair of fourth lenses.

2. The configurable lighting device of claim 1, wherein the first and second directions are orthogonal.

3. The configurable lighting device of claim 1, further comprising a controller coupled to control the first and second controllable optical modulators to steer and/or shape the light redirected by the first and third lenses respectively to select respective distributions of the light on the pairs of second and fourth lenses.

4. The configurable lighting device of claim 1, further comprising:
   a fifth lens coupled to receive and redirect light output from the one or more sources; and
   a third controllable optical modulator coupled to receive and spatially modulate light redirected by the fifth lens, the third controllable optical modulator absent any lens positioned to receive light on an output side thereof.

* * * * *